(12) United States Patent
Wisniewski et al.

(10) Patent No.: US 6,661,737 B2
(45) Date of Patent: Dec. 9, 2003

(54) ACOUSTIC LOGGING TOOL HAVING PROGRAMMABLE SOURCE WAVEFORMS

(75) Inventors: Laurence Wisniewski, Houston, TX (US); Georgios L. Varsamis, Houston, TX (US); Batakrishna Mandal, Missouri City, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 7 days.

(21) Appl. No.: 10/038,733

(22) Filed: Jan. 2, 2002

(65) Prior Publication Data

US 2003/0123326 A1 Jul. 3, 2003

(51) Int. Cl.[7] .............................. G01V 1/40; G06F 19/00
(52) U.S. Cl. ........................ 367/25; 181/103; 181/106; 702/14
(58) Field of Search ............................ 367/25; 702/14; 181/103, 106; 364/421, 422

(56) References Cited

U.S. PATENT DOCUMENTS

| 4,509,000 | A | * | 4/1985 | Ferguson | 364/181 |
|---|---|---|---|---|---|
| 4,794,572 | A | | 12/1988 | Sondergeld et al. | 367/31 |
| 4,817,061 | A | | 3/1989 | Alford et al. | 361/75 |
| 4,888,743 | A | | 12/1989 | Thomsen | 367/75 |
| 4,912,683 | A | * | 3/1990 | Katahara et al. | 367/25 |
| 5,027,332 | A | | 6/1991 | Alford | 367/75 |
| 5,029,146 | A | | 7/1991 | Alford | 367/75 |
| 5,136,554 | A | | 8/1992 | Thomsen et al. | 367/75 |
| 5,214,613 | A | | 5/1993 | Esmersoy | 367/31 |
| 5,278,805 | A | | 1/1994 | Kimball | 367/32 |
| 5,541,890 | A | | 7/1996 | Tang | 367/34 |
| 5,594,706 | A | | 1/1997 | Shenoy et al. | 367/76 |
| 5,712,829 | A | | 1/1998 | Tang et al. | 367/75 |
| 5,724,308 | A | * | 3/1998 | Sorrells et al. | 367/34 |
| 5,740,124 | A | | 4/1998 | Chunduru et al. | 367/73 |
| 5,808,963 | A | | 9/1998 | Esmersoy | 367/31 |
| 6,023,443 | A | | 2/2000 | Dubinsky et al. | 367/76 |
| 6,141,622 | A | | 10/2000 | Keller et al. | 702/16 |
| 6,188,961 | B1 | | 2/2001 | Mandal | 702/6 |

OTHER PUBLICATIONS

Alain Brie, et al; *New Directions in Sonic Logging*; Spring 1998; (pp. 40–55); Oilfield Review.
Chung Chang, et al; *Localized Maps of the Subsurface*; Spring 1998; (pp. 56–66); Oilfield Review.
N. Cheng, C. H. Cheng; *Borehole Geophysics 1: Well Logging*; 1995; (pp. 1–4); Expanded Abstract of 64th Annual Meeting, SEG.
PCT/US00/09704 International Search Report Dated Jun. 20, 2000 (4 p.).
Calvin Kessler et al; *A New Generation Crossed Dipole Logging Tool: Design and Case Histories*; 2001; (pp. 1–16).

(List continued on next page.)

*Primary Examiner*—Nelson Moskowitz
(74) *Attorney, Agent, or Firm*—Conley Rose, P.C.

(57) ABSTRACT

An acoustic tool that provides a programmable source waveform is disclosed. Numerous advantages may be achieved from the configurability of the source waveform. Notably, acoustic logs at multiple frequencies may be acquired with a single pass. The waveform may be frequency-adapted to maximize formation response and amplitude adapted for gain control. In one embodiment, the acoustic tool comprises: a controller, a digital-to-analog controller (DAC), an acoustic transducer, and a linear driver. The DAC converts a digital waveform from the controller into an analog waveform. The acoustic transducer converts an electrical signal into an acoustic signal. The linear driver receives the analog waveform from the DAC and responsively provides the electrical signal to the acoustic transducer. The electrical signal is proportional to the analog waveform. The tool may further include a memory for storing the digital waveform and/or software for generating the digital waveform.

21 Claims, 2 Drawing Sheets

OTHER PUBLICATIONS

A.L. Kurijian et al.; *Slowness Estimation From Sonic Logging Waveforms*; (pp.215–257); Geoexploration, vol. 27, Nos. 3/4, Mar. 1991; International Journal of Applied Geophysics.

C. F. Morris, et al.; *A New Sonic Array Tool for Full Waveform Logging*; (pp. 1–7); SPE Paper No. 13285; 1984, Society of Petroleum Engineers of AIME.

A. R. Harrison, et al.; *Acquisition and Analysis of Sonic Waveforms From a Borehole Monopole and Dipole Source for the Determination of Compressional and Shear Speeds and Their Relation to Rock Mechanical Properties and Surface Seismic Data*; (pp. 267–282); SPE Paper No. 20557; 1990, Society of Petroleum Engineers, Inc.

C. V. Kimball et al.; *Semblance Processing of Borehole Acoustic Array Data*; (pp. 274–281); Geophysics. vol. 49, No. 3, Mar. 1984.

D. P. Schmitt et al.; *Full–Wave Acoustic Logging: Synthetic Microseismograms and Frequency–Wavenumber Analysis*; (pp. 1756–1778); Geophysics, vol. 50, No. 11, Nov. 1985.

J. E. White et al.; *Underground Sound, Application of Seismic Waves*; (pp. 20–35 and 162–193); Methods in Geochemistry and Geophysics, 18, 1983.

B. Mandal; *Acoustic Logging Tool Having Quadrapole Source*; U.S. patent application Ser. No. 09/885,332, filed Jun. 20, 2001 (23 p.).

B. Mandal; *Acoustic Signal Processing Method Using Array Coherency*; U.S. patent application Ser. No. 09/860,294, filed May 18, 2001 (20 p.).

* cited by examiner

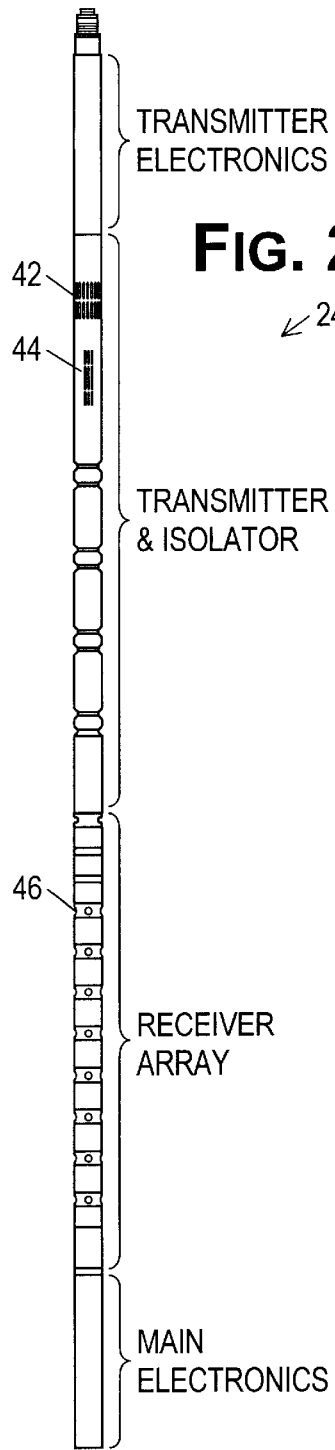
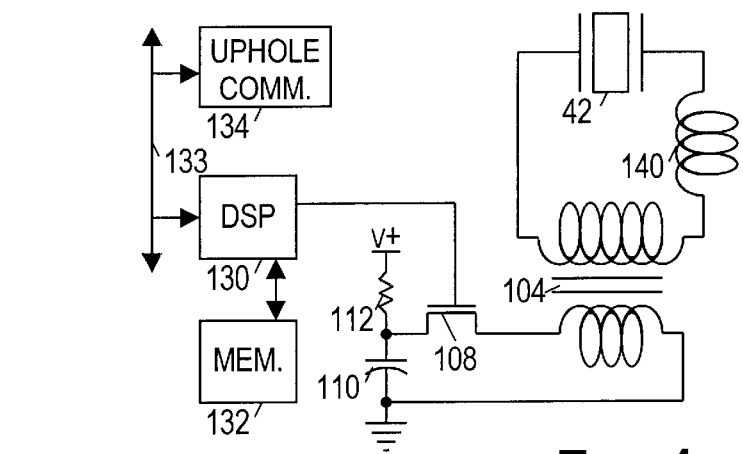
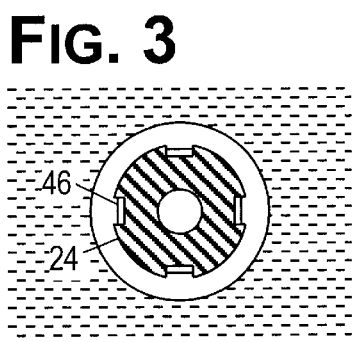
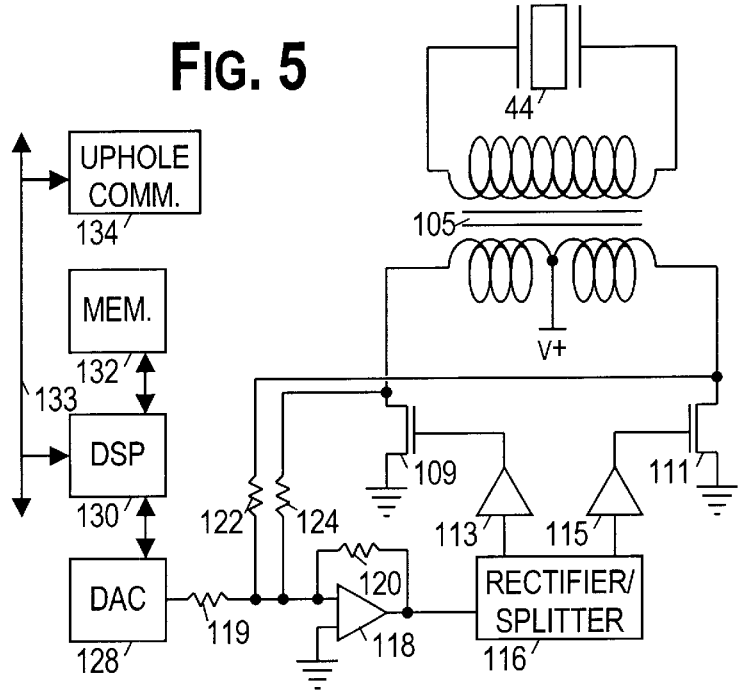

ACOUSTIC LOGGING TOOL HAVING PROGRAMMABLE SOURCE WAVEFORMS

FIELD OF THE INVENTION

The present invention relates generally to systems and methods for determining characteristics of a formation surrounding a borehole. More particularly, the present invention relates to an acoustic logging tool that provides enhanced performance through use of programmable source waveforms.

DESCRIPTION OF RELATED ART

Acoustic well logging is a well-developed art, and details of acoustic logging tools and techniques are set forth in A. Kurkjian, et al., "Slowness Estimation from Sonic Logging Waveforms", Geoexploration, Vol. 277, pp. 215–256 (1991); C. F. Morris et al., "A New Sonic Array Tool for Full Waveform Logging," SPE-13285, Society of Petroleum Engineers (1984); A. R. Harrison et al., "Acquisition and Analysis of Sonic Waveforms From a Borehole Monopole and Dipole Source . . . " SPE 20557, pp. 267–282 (September 1990); and C. V. Kimball and T. L. Marzetta, "Semblance Processing of Borehole Acoustic Array Data", Geophysics, Vol. 49, pp. 274–281 (March 1984), all of which are hereby incorporated by reference herein.

An acoustic logging tool typically includes an acoustic source (transmitter), and a set of receivers that are spaced several inches or feet apart. An acoustic signal is transmitted by the acoustic source and received at the receivers of the borehole tool which are spaced apart from the acoustic source. Measurements are repeated every few inches as the tool passes along the borehole.

The acoustic signal from source travels through the formation adjacent the borehole to the receiver array, and the arrival times and perhaps other characteristics of the receiver responses are recorded. Typically, compressional wave (P-wave), shear wave (S-wave), and Stoneley wave arrivals and waveforms are detected by the receivers and are processed. The processing of the data is often performed on the surface, although it may also be performed real time in the tool itself. Regardless, the information that is recorded is typically used to find formation characteristics such as formation slowness (the inverse of acoustic speed) and anisotropy, from which pore pressure, porosity, and other formation property determinations can be made. With some tools, the acoustic signals may even be used to image the formation.

Acoustic logging tools are used for both wireline logging and logging while drilling (LWD) applications. In wireline logging, a probe, or "sonde", housing multiple logging tools is lowered into the borehole after some or all of the well has been drilled. The sonde is attached to a conductive wireline that carries power from the surface to the tools in the sonde, and that carries telemetry information to the surface. The sonde may be transported through the borehole by the wireline, or a separate transport means may be provided. For example, in "pipe-conveyed" logging, the sonde is mounted on a tubing string. The rigidity of the tubing string allows the sonde to be transported through highly deviated and horizontal boreholes.

The problem with obtaining downhole measurements via wireline is that the drilling assembly must be removed or "tripped" from the drilled borehole before the desired borehole information can be obtained. This can be both time-consuming and extremely costly, especially in situations where a substantial portion of the well has been drilled. In this situation, thousands of feet of tubing may need to be removed and stacked on the platform (if offshore). Typically, drilling rigs are rented by the day at a substantial cost. Consequently, the cost of drilling a well is directly proportional to the time required to complete the drilling process. Removing thousands of feet of tubing to insert a wireline logging tool can be an expensive proposition.

As a result, there is a strong incentive to minimize the number of wireline logging trips. One way to do this involves collection of data during the drilling process. Designs for measuring conditions downhole including the movement and location of the drilling assembly contemporaneously with the drilling of the well have come to be known as "measurement-while-drilling" techniques, or "MWD". Similar techniques, concentrating more on the measurement of formation parameters, commonly have been referred to as "logging while drilling" techniques, or "LWD". While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

LWD tools are generally located as close to the drill bit as possible, so as to minimize the delay between reaching a formation and measuring its properties. When implemented as LWD tools, acoustic logging tools must overcome a number of obstacles to perform successfully. These obstacles include drilling noise, and acoustic properties of the thick tool body.

Accordingly, acoustic logging tools in both wireline and LWD applications have challenges to overcome.

SUMMARY OF THE INVENTION

Accordingly, there is disclosed herein an acoustic tool that provides a programmable source waveform. Numerous advantages may be achieved from the configurability of the source waveform. Notably, acoustic logs at multiple frequencies may be acquired with a single pass. The waveform may be frequency-adapted to maximize formation response and amplitude adapted for gain control. Numerous other potential advantages are also disclosed herein.

In one embodiment, the acoustic tool comprises: a controller, a digital-to-analog controller (DAC), an acoustic transducer, and a linear driver. The DAC converts a digital waveform from the controller into an analog waveform. The acoustic transducer converts an electrical signal into an acoustic signal. The linear driver receives the analog waveform from the DAC and responsively provides the electrical signal to the acoustic transducer. The electrical signal is proportional to the analog waveform. The tool may further include a memory for storing the digital waveform and/or software for generating the digital waveform.

The present invention further contemplates a logging method. The logging method comprises: (a) converting a digital waveform into an analog signal; (b) providing the analog signal to an acoustic transducer via a linear driver; and (c) producing an acoustic signal having a waveform that matches the digital waveform. The method may further include adapting the digital waveform to maximize a formation response and/or optimize the amplitude of a received signal.

BRIEF DESCRIPTION OF THE DRAWINGS

For a more detailed description of the preferred embodiment of the present invention, reference will now be made to the accompanying drawings, wherein:

FIG. 2 shows a preferred acoustic logging tool embodiment;

FIG. 3 shows a cross-sectional view of the receiver array;

FIG. 4 shows a schematic of control electronics for the monopole source; and

FIG. 5 shows a schematic of control electronics for a dipole source transducer.

Figure 1:
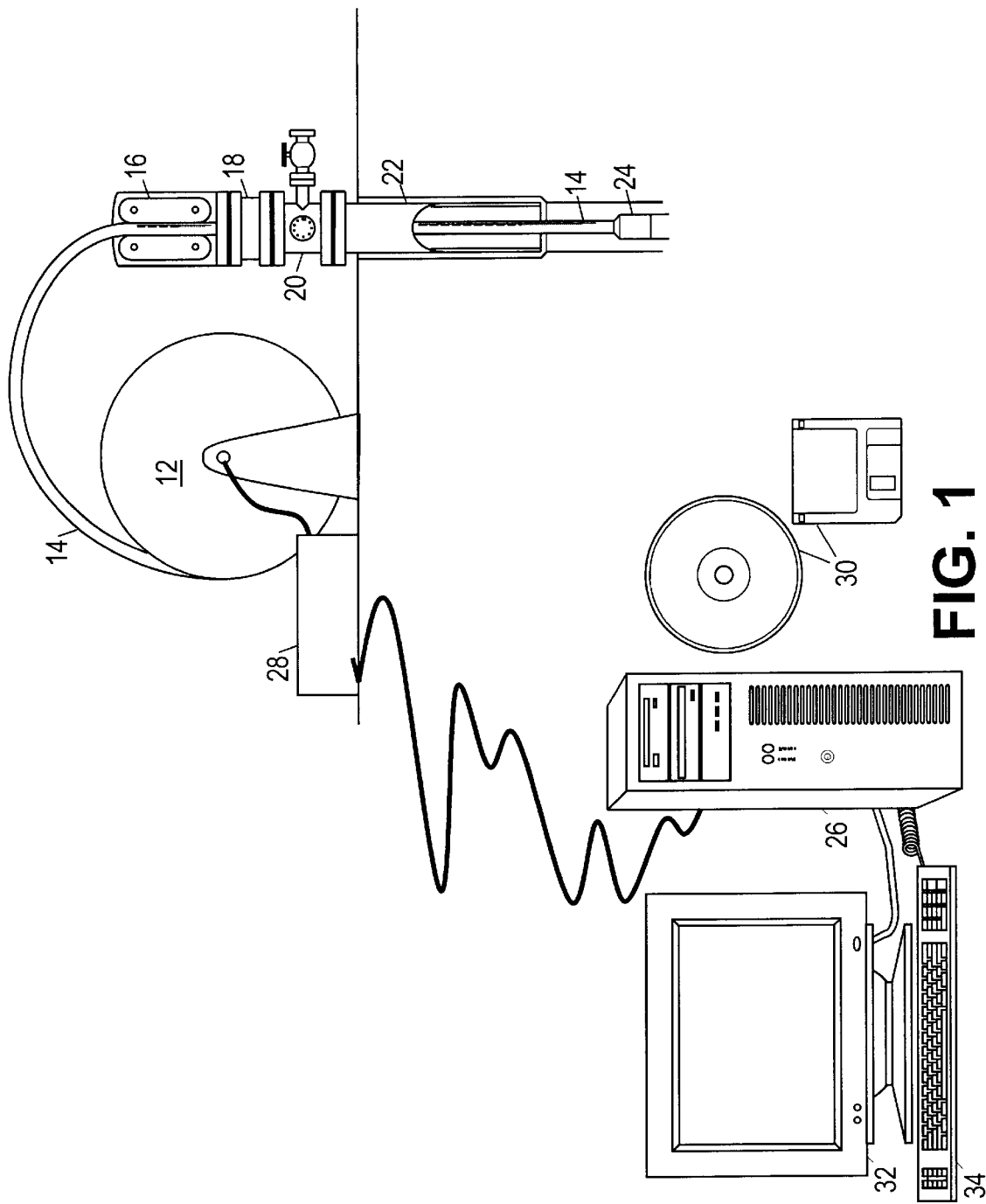
FIG. 1 shows a pipe-conveyed logging environment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

Turning now to the figures, FIG. 1 illustrates a typical pipe-conveyed logging environment. Continuous tubing 14 is pulled from a spool 12 and injected into a wellbore by an injector 106. The tubing 14 is injected through a packer 18 and a blowout preventer 20, and passes through casing 22 into the wellbore. In the well, downhole instrument sonde including an acoustic logging tool 24 is coupled to tubing 14. The sonde is preferably configured to communicate to a surface computer system 26 via information conduits contained in the tubing 14. A power supply 28 may be provided to supply power to downhole instrument 24 via power conduits in tubing 14. Alternatively, the power and telemetry may be conveyed by a wireline attached to the surface of the tubing 14.

Surface computer system 26 is preferably configured to communicate with acoustic logging tool 24. The acoustic logging tool 24 may be one of several downhole sensors and control device making up the instrument sonde. Surface computer system 26 is preferably configured by software 30 to monitor and control instruments in the instrument sonde. System 26 may include a device 32 and a user-input device 34 to allow a human operator to interact with the system control software 30.

FIG. 2 shows a preferred embodiment of an acoustic logging tool 24. The tool may be divided into four sections: the main electronics section, the receiver array, the transmitter and isolator section, and the transmitter control electronics. Each of these sections is discussed in turn below.

Main Electronics

The main electronics section controls the acquisition of the waveform data and communication with the surface. The signals from each of the 32 receiver transducers are preferably digitized using high resolution (e.g., 18 bit) analog-to-digital converters (ADC) and transmitted to the surface. The waveform data is preferably acquired without adaptive gain control (AGC) (although an equivalent AGC option exists for the monopole firing). The overall acquisition system has demonstrated an equivalent gain bandwidth of over 90 dB achieved by controlling the receiver sensitivity and source output, making the use of an AGC unnecessary. Nevertheless, an AGC may be included in some embodiments.

A typical transmitter firing sequence at each depth involves firing the monopole source, firing the X—X dipole, then firing the Y—Y dipole. With 100 ms interval between each firing (this interval is programmable), the main electronics acquire 96 digitized waveforms every 300 ms and send them to the surface. The logging speed may be limited by the net telemetry rate, the desired depth sampling rate, and/or the processing power of the acquisition system at the surface. Under normal operating conditions (full acquisition of one monopole and two dipole activations; processing for the monopole and one, or both, of the dipole arrays) a logging speed of 1800 ft/hr has been achieved with a full quad-combo logging string (resistivity, acoustic, density, neutron, directional-navigation, gamma, and multi-axis caliper). Advantages to acquiring and transmitting the full set of 96 receiver waveforms without any processing downhole include the ability to use advanced processing algorithms on the full set of waveforms to derive azimuthal information on the compressional velocity, as well as perform advanced processing for refracted shear wave anisotropy.

Receiver Array

In the preferred embodiment, the receiver array consists of 32 receiver crystals arranged in eight co-planar rings. Each ring has four receivers mounted perpendicular to the tool axis and evenly distributed at 90 degrees from each other, as shown in FIG. 3. The circumferential positioning of the receivers is preferably aligned with the dipole sources so that there are two in-line arrays and two cross-line arrays for both the X—X and Y—Y dipole sources. The offset from the uppermost receiver ring is 10.2 feet (3.1 m.) from the monopole source and 9.2 feet (2.8 m.) from the on-depth X—X Y—Y dipole sources. The spacing between the receiver rings is 0.5 ft (0.15 m.). This gives a receiver array length of 3.5 feet (1.07 m.). In the dipole acquisition mode, the in-line receiver array and the cross-line receiver array are each 2 by 8 arrangements of receivers.

In the preferred embodiment, the receivers have a frequency response from 0.5 kHz to about 20 kHz. As shown in FIG. 3, the 32 individual receivers 46 are mounted in receiver pockets, slightly indented from the external surface of the tool housing. Each receiver is individually pressure and temperature compensated to the full extent of the operating specifications for the tool (e.g., 20,000 psi, 175° C.). This allows for easy wellsite maintenance if one of the receivers is damaged for any reason, without the need for elaborate oil filling or evacuation stations.

The receivers are preferably matched in sets of four and in sets of 32. The matching may be done as follows with the fully assembled receiver filled with the proper amount of the oil required the pressure and temperature compensation system. Each receiver is individually tested to 20,000 psi and 150° C. (ANSI-1988). Each receiver's response to a known calibrated source is recorded at many different frequencies. Once all the data is collected, receivers having closely matches responses are grouped in sets of four and in sets of 32. The accepted flatness of the receiver response across a wide frequency range is ±2 dB (with the measured average closer to ±0.75 dB). The accepted sensitivity difference between the four receivers of a quad is ±0.75 dB (with the measured average closer to ±0.2 dB). Through several of the field tests and the commercial jobs of this tool, the actual receiver matching under downhole conditions was analyzed and found to be well within the ranges quoted above.

In the preferred embodiment, the acoustic sources and receiver array 46 are preferably based on piezoelectric elements designed to operate in downhole conditions. However, many other sources and detectors are suitable for downhole operation, and may be used.

Transmitter & Isolator

The transmitter and isolator section includes a monopole transmitter 42, a pair of crossed-dipole transmitters 44, and an acoustic isolation component. The monopole transmitter 42 includes a piezoelectric crystal of cylindrical geometry. The crystal is mounted in an arrangement that allows the transmitted acoustic energy to be essentially uniform around the circumference of the tool. The monopole transmitter is energized in the typical 'pulsed' mode (described below with reference to FIG. 4), where an essentially pure monopole wave is emitted with a center frequency around 5–6 kHz and energy throughout the frequency band between 1 kHz and 12 kHz. This center frequency is between approximately a third and a half of the monopole transmitter frequency of traditional monopole tools. The lower frequency results in a much greater depth of investigation for the P wave and refracted shear wave. The monopole source is utilized for derivation of the refracted arrivals from the full wave acquisition, i.e. the compressional wave velocity (as well as other associated properties such as energy, frequency content, etc.), the refracted shear wave velocity and its associated wave properties, and the Stoneley wave velocity with its own associated parameters.

Each of the dipole transmitters 44 includes two transducers mounted on opposite sides of the tool 24. The crossed dipoles are mounted perpendicularly, so that together, the crossed dipoles form an on-depth quad arrangement of transducers (similar to the receiver transducers shown in FIG. 3). Each of the four dipole transducers are preferably of the "bender bar" type, i.e. a flexible surface having piezoelectric crystals on opposing sides. As the crystal on one side is driven to elongate, the crystal on the opposite side is driven to shrink. This causes the assembly to flex. Acoustic signals are transmitted by flexing the surface at the desired frequencies. The signal frequency is programmable, as described below, but the transducers are preferably capable of signal frequencies between at least 0.5 kHz to 3 kHz.

The orthogonal positioning of the bender bar transducers allows for a controlled X—X and Y—Y flexural wave generation. The sources are mounted in a way such that very little energy is coupled into the tool housing assembly, thus minimizing the excitation of unwanted acoustic waves in the tool itself. In addition, the source mounting ensures that there is no cross-excitation from one pair of the bender bars to the other, thus ensuring a proper acoustic dipole signature.

Rigorous testing of the preferred embodiment has been performed, both in laboratory settings utilizing large water tanks as well as in the Lake Travis test facility at the University of Texas, Austin. The tests have confirmed that the fully assembled source is a true dipole. Measurements in the test facilities have shown that the dipole transmitter design emits a true wave with X—X and Y—Y directional properties of at least 25 to 30 dB reduction from the maximum at the dipole lobes to the minimum at the cross axis points.

The acoustic isolator serves to attenuate and delay acoustic waves that propagate through the body of the tool from the sources to the receiver array 46. Any standard acoustic isolator may be used, although a preferred isolator embodiment is described in co-pending U.S. patent application Ser. No. 10/007,955 (atty. dkt. #1391-27000), which is hereby incorporated by reference. This isolator provides two notable advantages: it can withstand 100,000 pounds force of push or pull, and it provides for more than 90 dB of acoustic isolation over an extended frequency range, extending as low as about 500 Hz to 600 Hz.

In addition to the main isolator, additional acoustic wave isolators/absorbers are preferably placed on the receiver section both at the ends and between successive receiver sets. Finally, the mounting of the dipole sources and the receivers themselves provides further isolation. The combination of all of the above has allowed this tool to properly acquire formation acoustic signals in the sub-kilohertz region, a region that is very close to the limit for the excitation of flexural waves. (The excitation function for the flexural waves exhibits a dramatic drop as the source frequency is reduced to the area of 600 Hz to 1 kHz; source operating frequencies below that level will excite predominantly tube waves with very little, if any, flexural wave components.)

Transmitter Electronics

When the main electronics section enables the operation of the acoustic logging tool, the transmitter electronics controls the triggering and timing of the acoustic sources. A controller in the transmitter electronics fires the acoustic sources periodically, thereby producing acoustic pressure waves that propagate through the borehole fluid and into the surrounding formation. At the borehole boundary, some of the acoustic energy is converted into P-waves that travel through the formation, and into shear waves that propagate along the interface between the borehole fluid and the formation. As these waves propagate past the receiver array 46, they cause pressure variations that can be detected by the receiver array elements. The receiver array signals are preferably processed on the surface to determine the formation characteristics.

FIG. 4 provides a schematic for the control electronics of the monopole source. These control electronics are more-or-less representative of existing acoustic tools. The monopole source 42 is coupled to the secondary winding of a step-up transformer 104. (A tuning inductance 140 is commonly included to lower the resonant frequency of the signal.) The primary winding of transformer 104 is coupled to a capacitor 110, and a transistor 108 momentarily closes the current loop between the primary winding and the capacitor 110. When transistor 108 is off, the capacitor 110 is charged by a voltage source via a resistance 112 (or a transistor or other current-limiting means).

Transistor 108 is controlled by a controller 130. To "fire" the monopole source, the controller 130 asserts a control signal that turns transistor 108 on, thereby allowing capacitor 110 to discharge through the primary winding of transformer 104. This causes an oscillatory current in the secondary winding. This oscillatory current is an electrical signal that causes monopole source 42 to generate an acoustic signal.

In the preferred embodiment, controller 130 is a digital signal processor (DSP) that executes software stored in an attached memory 132. The controller 130 may be coupled to an uphole communications module 134 via a tool bus 133. A surface computer 26 (FIG. 1) can communicate with the controller 130 to read and change operating parameters of the controller 130 and of the software algorithms.

One significant difference from earlier generation crossed-dipole tools, and a distinct advantage of the source employed in this tool, is the dipole source excitation mechanism and its associated control electronics. In simple terms this dipole source is fully programmable in all its aspects including frequency, amplitude, emitted wave signature, and wave duration. In addition to the programmability of the dipole source characteristics, the electronics in the tool offer almost limitless control of the source "firing" sequence and the timing between consecutive firings.

FIG. 5 provides a schematic for the control electronics for one of the dipole source's transducers. Unlike that of the monopole source, the drive circuit for the dipole source transducers employ a linear driver configuration. Accordingly, the acoustic signal generated by transducer 44 closely tracks the analog signal generated by digital-to-analog converter (DAC) 128 in response to a digital waveform provided by controller 130. The waveform may be stored in memory 132 or may be generated in accordance with the software stored therein. In an alternative embodiment, the waveform may be transmitted from the surface.

Transducer 44 converts an electrical signal into an acoustic signal through voltage-induced expansion and contraction. The expansion and contraction of transducer 44 are respectively caused by positive and negative voltage differences across the terminals. Positive voltage differences are induced in the secondary winding of transformer 105 when transistor 109 turns on and transistor 111 is off. Conversely, negative voltage differences are induced when transistor 111 turns on and transistor 109 is off. The control signals for transistors 109, 111 are provided from a rectifier/splitter module 116 via amplifiers 113, 115.

The rectifier/splitter module 116 splits an input signal into two output signals. One of the output signals represents the input signal when the input signal is positive, and equals zero when the input signal is negative. The other output signal represents the negative of the input signal when the input signal is negative, and equals zero when the input signal is positive. Thus, both output signals are always positive or zero.

The remaining portion of the control electronics for the dipole source transducer is summing amplifier 118. The output of summing amplifier 118 is provided as the input signal to rectifier/splitter module 116. The summing amplifier has a non-inverting input, which is grounded, and an inverting input, which receives a weighted sum of four signals: the analog signal from DAC 128, the output of summing amplifier 118, and the voltages on the outer terminals of the primary winding of transform 105. Each of the four signals is provided to the inverting input of summing amplifier 118 via a corresponding resistance 119, 120, 122, 124. The relative weights of resistances 119–124 are selected to cause the voltages on the outer terminals of the primary winding to track their respective portions of the analog signal as closely as possible. This design permits the use of high-power rated MOSFET transistors (which are typically nonlinear devices) in a high-power linear amplifier. For more details on the basics of operational amplifier design, refer to any standard electronics text, such as Horowitz and Hill, *The Art of Electronics,* 2ed, ©1989 Cambridge University Press.

In classical wireline dipole logging the source activation period and the sequence at which the sources are activated, is pretty much defined only by the logging speed and the requirement of a set number of samples per foot. In a typical scenario, existing acoustic logging tools will energize the monopole source, and then energize the two dipole sources in sequence (or first energize the two dipole sources and then the monopole source). The present tool allows the operator to program the tool for the complete source activation sequence to almost any conceivable combination of energizing the three sources in sequence. Depending on the formation evaluation requirements, a scenario in which only a section of the well is logged in full crossed-dipole mode can be envisioned and can be accommodated by the advanced controls implemented in this design.

Further to the source control, the timing between consecutive activations is also programmable. The sources may be fired individually or concurrently (in the latter case, the sources would preferably emit distinguishable waveforms). In the expected operating scenario the three source activations (monopole, dipole X, dipole Y) occur at 100 ms separation from each other. For the standard logging speed of 1800 ft/hr this implies a depth displacement of 0.6 inches between consecutive dipole source activations, giving dipole acquisitions that are essentially "synchronized" both in depth and in time. Because the 64 dipole waveforms are acquired within 0.6 inches of vertical tool movement, depth shifting of the waveform data for X–Y dipole source offsets and transmitter firing delays is not required.

The programmability of the disclosed acoustic tool makes possible a variety of improved logging methods. In one improved logging method, multiple frequencies are used. In the first firing sequence (e.g. monopole, X—X dipole, Y—Y dipole), the dipole waveform frequency is set to a low frequency (e.g. 0.5 kHz), and in the next firing sequence, the dipole waveform frequency is set to a high frequency (e.g. 3 kHz). The controller 130 may alternate between two frequencies or cycle through multiple frequencies. In this manner, acoustic logs at multiple frequencies may be acquired in a single run.

In another improved logging method, multiple waveforms are used. In a first firing sequence, a "chirp" dipole waveform is transmitted. A notable characteristic of chirp waveforms is that they "sweep" across a range of signal frequencies. The controller 130 may process the results from this firing to determine a best formation investigation frequency, and then use a single-frequency pulse (or other narrow frequency band signal) as the waveform for the next firing sequence. Tests have clearly shown that there is an optimal frequency for exciting flexural waves, and this approach is expected to greatly enhance the formation response to flexural waves.

In yet another improved logging method, the controller 130 monitors the received signal amplitudes and responsively adapts the amplitude of the transmitted dipole waveform. The signal amplitude is preferably optimized to maximize the energy transmitted through the formation without saturating the receivers.

In another improved logging method, the dipole waveform is a Ricker wavelet. Ricker wavelets are commonly employed in seismography, and their use in acoustic logging may facilitate the synthesis of logging data with seismography data.

In still another improved logging method, the controller 130 adjusts the duration of the transmitted waveform to compensate for extraneous noise. Increasing the waveform duration increases the transmitted energy, thereby improving the measurement signal-to-noise ratio (SNR). Alternatively, the duration may be altered to tailor the bandwidth of the waveform.

In still another improved logging method, the controller 130 fires the transducers in an order that depends on the desired resolution of measurements based on a given waveform. For example, a low frequency dipole log may require fewer measurements than a high-frequency dipole log. Accordingly, the controller 130 may be programmed to fire the dipole transducers with a low-frequency waveform less often than firing them with a high-frequency waveform (e.g. ½ as often). This would permit faster logging or reduce the necessary telemetry bandwidth.

In yet still another improved logging method, the controller 130 adaptively adjusts the frequency of the dipole waveform to maximize the formation response. In addition to maximizing the SNR of the measurements, this logging method also provides an acoustic frequency log of the formation, i.e. a log showing the resonance frequency of successive formation layers.

In a further improved logging method, the controller 130 may be programmed with a dipole waveform that maximizes the signal energy while minimizing the tool mode. That is, the programmed waveform may be a broadband signal with frequency nulls at vibration modes of the tool body.

Other parameters that are preferably programmable include: the firing rate, the digitizing interval (i.e. the sampling frequency of the A/D converter), and the number of samples acquired by each sensor.

Of course, in each of the above methods, the adjusted parameters may be controlled from the surface, either automatically or by manual control; or they may be controlled by the tool itself (e.g. using adaptive control mechanisms or algorithms).

The acoustic logging tool is fully combinable with all logging suites, thus minimizing the number of logging trips required for formation evaluation. The low frequency monopole transmitter (compared to other full waveform and dipole sonic tools) allows the Vp/Vs measurements to be obtained within similar depths of investigation, well beyond any near-wellbore altered region. And lastly, the on-depth crossed dipole sources and transmitter firing sequence, allows for all 64 dipole waveforms from the eight level receiver array to be reliably used for anisotropy analysis without the need of depth shifting, or normalization of waveform data.

Numerous variations and modifications will become apparent to those skilled in the art once the above disclosure is fully appreciated. For example, the tool may be adapted for use in LWD/MWD, wireline, pipe-conveyed logging, etc. It is intended that the following claims be interpreted to embrace all such variations and modifications.

What is claimed is:

1. An acoustic logging tool that comprises:
    a controller;
    a digital-to-analog converter (DAC) that converts a digital waveform from the controller into an analog waveform;
    an acoustic transducer that converts an electrical signal into an acoustic signal; and
    a linear driver that receives the analog waveform from the DAC and responsively provides the electrical signal to the acoustic transducer, wherein the linear driver includes a feedback path to minimize error between a scaled version of the electrical signal and the analog signal.

2. The acoustic logging tool of claim 1, wherein the digital waveform is programmable.

3. An acoustic logging tool that comprises:
    a controller;
    a digital-to-analog converter (DAC) that converts a digital waveform from the controller into an analog waveform;
    an acoustic transducer that converts an electrical signal into an acoustic signal;
    a linear driver that receives the analog waveform from the DAC and responsively provides the electrical signal to the acoustic transducer; and
    a memory coupled to the controller, wherein the controller generates the digital waveform in accordance with software stored in the memory.

4. The tool of claim 2, further comprising:
    a memory coupled to the controller, wherein the memory is configured to store the digital waveform.

5. The tool of claim 2, wherein the digital waveform is a broadband signal with spectral nulls that minimize a tool mode.

6. The acoustic logging tool of claim 2, wherein digital waveform is communicated to the controller from a surface computer while the tool is downhole.

7. The tool of claim 2, wherein the controller operates according to a programmable firing rate for the acoustic transducer.

8. The tool of claim 7, wherein the duration of the digital waveform is programmable.

9. The tool of claim 1, wherein the controller adapts a center frequency of the digital waveform to maximize a formation response to the acoustic signal.

10. An acoustic logging tool that comprises:
    a controller, the controller adapts an amplitude of a digital waveform to maintain a receive signal within a predetermined dynamic range;
    a digital-to-analog converter (DAC) that converts the digital waveform from the controller into an analog waveform;
    an acoustic transducer that converts an electrical signal into an acoustic signal; and
    a linear driver that receives the analog waveform from the DAC and responsively provides the electrical signal to the acoustic transducer.

11. The tool of claim 1, wherein the acoustic transducer includes a piezoelectric crystal.

12. The tool of claim 1, wherein the controller provides multiple, different, digital waveforms to the DAC.

13. The tool of claim 12, wherein one of the digital waveforms is a chirp signal, and wherein another of the digital waveforms is a frequency pulse.

14. The tool of claim 12, wherein one of the digital waveforms has a central frequency that differs from a central frequency of another of the digital waveforms.

15. The tool of claim 1, wherein the acoustic transducer is one of a set of acoustic transducers that form a crossed dipole source.

16. The tool of claim 1, wherein the linear driver includes an operation amplifier in a feedback configuration that reduces any difference between the electrical signal and the analog waveform.

17. The tool of claim 1, wherein the linear driver further includes:
    an operational amplifier;
    a rectifier/splitter that receives an output signal from the operational amplifier and converts the output signal into a positive signal that corresponds to a positive portion of the output signal, and into a negative signal that corresponds to an inverted negative portion of the output signal;
    a transformer having a positive primary with a voltage controlled by the positive signal, a negative primary with a voltage controlled by the negative signal, and a secondary coupled to the acoustic transducer,
    wherein the operational amplifier is configured to reduce a difference between the transformer primary voltages and the analog waveform.

18. A logging method that comprises:
    converting a digital waveform into an analog signal;
    providing the analog signal to an acoustic transducer via a linear driver;
    producing an acoustic signal having a waveform that corresponds to the digital waveform;

receiving acoustic energy that has passed through a formation in response to said producing an acoustic signal; and adapting an amplitude of the digital waveform to limit a maximum amplitude of the received acoustic energy.

19. The method of claim 18, further comprising:

converting a second digital waveform into an analog signal, wherein the second digital waveform is different from the first digital waveform; and producing an acoustic signal that corresponds to the second digital waveform.

20. The method of claim 18, further comprising:

adapting an amplitude of the digital waveform to limit a maximum amplitude of the received acoustic energy.

21. A logging method that comprises:

storing a digital waveform in a downhole memory;

retrieving the digital waveform from the downhole memory;

applying the digital waveform to a digital to analog converter (DAC) that converts the digital waveform into an analog signal;

providing an electrical signal to an acoustic transducer from a linear driver, wherein the linear driver includes a feedback path to minimize error between a scaled version of the electrical signal and the analog signal.

* * * * *